United States Patent [19]

Sampath et al.

[11] Patent Number: 5,326,436

[45] Date of Patent: Jul. 5, 1994

[54] FRACTIONATOR FEED METHOD

[75] Inventors: Vijay R. Sampath, Bellingham, Wash.; David E. Bachmann, Irvine, Calif.

[73] Assignee: Atlantic Richfield Company, Los Angeles, Calif.

[21] Appl. No.: 978,619

[22] Filed: Nov. 19, 1992

Related U.S. Application Data

[62] Division of Ser. No. 745,641, Aug. 15, 1991, Pat. No. 5,230,839.

[51] Int. Cl.$^5$ .................................................. B01D 3/14
[52] U.S. Cl. .................................. 203/98; 202/158; 202/197; 203/40; 203/DIG. 22; 261/114.1
[58] Field of Search .............. 203/DIG. 22, 98, 40, 203/99, 100; 261/114.1; 202/158, 197, 161; 55/185, 186

[56] References Cited

U.S. PATENT DOCUMENTS

| | | | |
|---|---|---|---|
| 4,138,327 | 2/1979 | Scott | 208/146 |
| 4,275,021 | 6/1981 | Kirkpatrick et al. | 202/158 |
| 4,295,936 | 10/1981 | Farnham | 202/158 |
| 4,327,184 | 4/1982 | Johnson et al. | 202/234 |
| 4,601,788 | 7/1986 | Bannon | 202/158 |
| 4,629,534 | 12/1986 | Ezell | 203/99 |
| 4,714,542 | 12/1987 | Lockett, Jr. | 202/158 |
| 5,091,119 | 2/1992 | Biddulph et al. | 261/114.3 |

Primary Examiner—Virginia Manoharan
Attorney, Agent, or Firm—Tom F. Pruitt

[57] ABSTRACT

A method of feeding to a fractionator a feed mixture having a wide-boiling range vapor-liquid mixture is provided. Also, provided is a fractionator feed section adapted to receive a two phase feed mixture and has operational stability when fed a feed mixture which generates significant volume of vapor in the feed section.

1 Claim, 2 Drawing Sheets

FRACTIONATOR FEED METHOD

This is a division of application Ser. No. 07/745,641, filed Aug. 15, 1991, now U.S. Pat. No. 5,230,839.

BACKGROUND OF THE INVENTION

1. Field of the Invention

In one aspect, this invention relates to a method of feeding a two phase vapor-liquid feed mixture to a fractionator. In another aspect, this invention relates to a method of feeding a wide-boiling range mixture to a fractionator. In still another aspect, this invention relates to an improved fractionator feed section.

2. Background

Fractionation is used to separate feed mixtures into various distillate and residual streams. In certain applications, the fractionator feed can be a two-phase vapor-liquid mixture. In other applications, feed to the fractionator can have a wide-boiling range. It is common in petroleum or heavy oil fractionation to have complex feeds and to feed a two-phase mixture to a fractionator or to have a fractionator feed which generates a significant volume of vapor in the fractionator feed section. For example, with crude tower feed, it is generally desirable to preheat the crude in a furnace to the maximum allowable temperature prior to feeding the crude to the crude tower. Since crude oil contains a quantity of relatively light and volatile hydrocarbons as well as many much heavier components, the preheated crude tower feed can be two-phase. Also, as another example of complex feeds, various refinery heavy oil streams can be combined with reactor effluent streams, recycle oil streams and other streams having components with widely differing boiling points to form a fractionator feed. This feed can result in significant feed generated vapor in the fractionator feed section, especially when large concentrations of light hydrocarbons are fed to a relatively high temperature zone of the fractionator.

Generally, fractionators contain a number of trays where ascending vapor in the fractionating tower is contacted with liquid cascading down the tower, which contact causes heat and mass interchange on each tray. Each tray comprises a downcomer to direct liquid from such tray to the tray below, a weir to maintain a liquid level on such tray, perforations to permit vapor passage upward through such tray, and a contacting means such as bubble caps, valve tray, or the like to enhance liquid-vapor contact. The vapor becomes progressively lighter as it rises through the tower and the liquid becomes progressively heavier as it passes down the tower. The vapor leaving the tower is totally or partially condensed and generally at least a portion of the condensed stream is returned back to the top tray of the tower as reflux and a portion is recovered as distillate product.

Fractionating towers can contain one-, two-, three- or four-pass trays. In a single-pass tray configuration, there is only one flow path for liquid across each tray and downward from the tray as the downcomer is located only on one side of the tray. For a two-pass tray configuration, two flow paths are available for the liquid. Accordingly, two types of trays are used in a two-pass fractionating tower, one of which is a center downcomer tray and the second is a side downcomer tray. Three-pass and four-pass configurations are variations of the foregoing.

In many prior art fractionating processes, the fractionator feed tray is selected such that the feed mixture is fed to a zone of the fractionator where the feed temperature is similar to the temperature of the vapor-liquid mixture on the tray. This usually results in the smallest diameter fractionator and also saves energy. Further, the feed can thus be introduced to the column with minimal upset to the column if only a relatively modest portion of the feed is vaporized on the feed tray.

In a typical equipment arrangement for a fractionator feed section, the fractionator is equipped with multiple feed nozzles. Each feed nozzle is directed to a different tray, each of which can be selected as the feed tray. The feed is then fed through the desired nozzle. The multiple nozzle arrangement permits changing of feed location to enable the feed to be directed to a portion of the column where its introduction will not result in operational instability. Typically, in such arrangement, tray spacing is uniform. Generally, the feedstock is introduced to the tray selected as the feed tray on the side of the feed tray side opposite to the feed tray downcomer to obtain reasonable mixing of the feed with the effluent passing through the downcomer from the tray above the feed tray and to provide for some retention or "hold-up" time for liquid-vapor contact on the feed tray. However, in crude and heavy oil fractionation, changing location of the feed to the tower generally does not reduce problems associated with inadequate mixing, entrainment and instability.

Unstable operation and liquid entrainment are problems associated with feeding a feed mixture with a relatively large concentration of volatile components to a high temperature zone of a fractionator. Rapid gaseous expansion and a large quantity vapor flow occur in the feed section of a prior art fractionating column to which a relatively volatile feed mixture is fed. If the feed comprises large concentrations of low boiling components, upsets from vapor expansion occur in the feed section. As large amounts of ascending vapor from the feed tray pass through the liquid on the tray above the feed tray, droplets of liquid will be entrained into such ascending vapor. As the vapor velocity is increased in the feed section of the column due the gaseous expansion of the volatile feed, entrainment and carry over of droplets increases, and column separation efficiency and capacity are limited thereby. Frequently, the spacing between the feed tray and the tray above the feed tray are set at the same tray spacing as all of the trays in the column; however, in certain applications in prior art columns, the distance between the feed tray and the tray above are increased to minimize liquid entrainment. This increase in tray spacing results in a loss of the number of trays available for separation and loss of fractionator capacity and/or efficiency.

It is desirable to have a method of feeding a relatively volatile feed mixture to a fractionator. It is also desirable to have a fractionating column feed section which reduces entrainment of liquid caused by vaporization of feed in the feed section and achieves good mixing of the feed with the liquid and vapor to the feed tray.

SUMMARY OF THE INVENTION

It is thus one object of this invention to provide a method of feeding to a fractionator a feed mixture comprising a wide-boiling range vapor-liquid mixture. It is another object of this invention to provide a fractionator feed section adapted to receive a two phase feed mixture. It is still another object of this invention to provide a fractionator that has operational stability when fed a feed mixture which generates a significant volume of vapor in the feed section.

We have discovered that fractionator operating stability can be improved by a fractionator feed section which provides increased expansion area for expansion of feed generated vapor. We have found that liquids' entrainment from a fractionator feed tray to the tray above the feed tray can be reduced by a properly designed feed tray. In addition, we have discovered that mixing of the vapor portion of a two phase vapor-liquid feed with vapor rising from the tray below the feed section can be improved. We have also found that improved distribution of the feed liquid throughout the feed section by a feed section of this invention results in improved mixing of the liquid portion of the feed with the reflux liquid from the tray above the feed tray. We have invented a fractionator feed section which provides for improved contacting of tray vapor and tray liquid to provide for improved mass and heat transfer on the tray.

In accordance with one embodiment of this invention a fractionator feed section is provided for a fractionator to which is fed a feed mixture comprising a vapor component and a liquid component and which fractionator comprises a tray above the feed section which passes a liquid reflux to the feed section. In one variation of this embodiment, the feed section comprises a downwardly extending, elongated first baffle, a downwardly extending, elongated second baffle, a seal pan below the first baffle and the second baffle, the seal pan comprising a seal pan mixture of liquids into which a portion of the first baffle and a portion of the second baffle extend to form a mixing zone, a feed nozzle which extends partway into the seal pan and introduces the liquid component and the vapor component downward into the mixing zone, and,
a trough which brings the liquid reflux into the mixing zone, wherein the liquid component and the liquid reflux mix to form the seal pan mixture of liquids. In another variation of this embodiment of this invention, the vapor component is deflected by the first baffle and the second baffle, causing the vapor leaving the feed pipe to reverse direction which results in disengagement of entrained liquid which is permitted to fall downward into the seal pan.

In another embodiment of this invention, a fractionator feed section is provided to a fractionator to which is fed a feed mixture comprising a vapor component and a liquid component and which fractionator comprises a tray above the feed section which comprises a downcomer which passes liquid reflux downward to the feed section wherein the feed section comprises a feed nozzle which extends partway into the seal pan and feeds the liquid component and the vapor component to the feed section, a first downwardly extending, elongated baffle plate and a second downwardly extending, elongated baffle plate which form a mixing zone having a top portion and a bottom portion, the bottom portion being positioned below the outlet of the feed nozzle and the top portion being adapted to receive the liquid component of the feed mixture, a reflux trough, the reflux trough being adapted to receive the liquid reflux from the downcomer of the tray above the feed section and pass the liquid reflux to the top portion of the mixing zone wherein the liquid reflux is mixed with the liquid component of the feed mixture to form a liquid mixture, and, a liquid seal pan into which the lower end of the mixing zone extends, the seal pan adapted to receive the liquid mixture and pass the liquid mixture from the seal pan. In one variation of this embodiment, the feed nozzle directs the vapor component and the liquid component in a direction toward the mixing zone. In another variation, the mixing zone causes the vapor leaving the feed pipe to reverse direction. In still another variation, the seal pan receiving the liquid mixture comprises, a tray, a first interior weir extending upward from the tray and a first exterior weir extending upward from the tray to form a first liquid mixture between the first interior weir and the first exterior weir, a second interior weir extending upward from the tray and a second exterior weir extending upward from the tray to form a second liquid mixture between the second interior weir and the second exterior weir, a first downcomer to direct flow of the first liquid mixture from the seal pan, and, a second downcomer to direct flow of the second liquid mixture from the seal pan, and, a liquid seal formed by the liquid mixture in the bottom portion of the mixing zone and between the first interior weir and the second interior weir.

In another embodiment of this invention a fractionating process is provided for separating a feed mixture into a distillate product fraction and a residual liquid product fraction in a fractionating column comprising a feed section, wherein the feed mixture comprises a liquid, the fractionating process comprising introducing heat energy to vaporize the liquid to form ascending vapor, removing heat energy to condense vapor to form descending liquid reflux, contacting the ascending vapor with the descending liquid reflux. In one variation of this embodiment, such fractionating process comprises forming a mixing zone between a first baffle, a second baffle, and a seal pan below the first and second baffle, the seal pan comprising a seal pan mixture of liquids into which a portion of the first baffle and the second baffle extend, feeding the feed mixture downward into the mixing zone, feeding the descending liquid reflux to the mixing zone, and, mixing the feed mixture with the liquid reflux to form the seal pan mixture of liquids.

DESCRIPTION OF A PREFERRED EMBODIMENT

Figure 1:
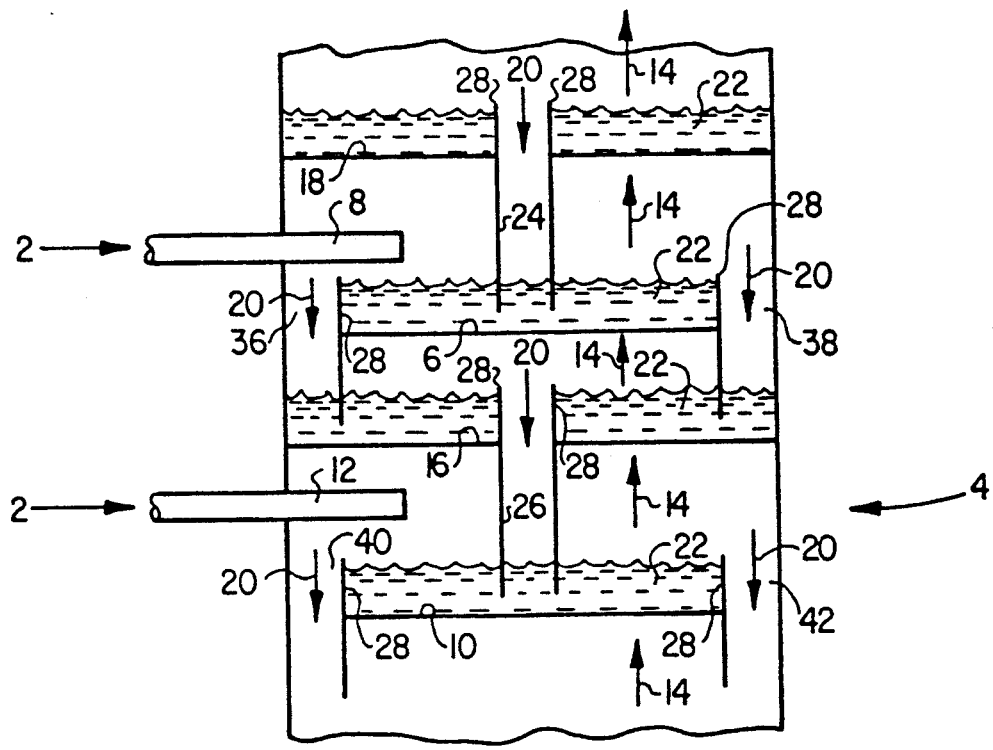
FIG. 1 is a schematic representation of a side view of prior art fractionator feed section for a fractionator comprising a two-pass tray configuration.

In FIG. 1, a schematic representation of a side view of prior art fractionator feed section for a fractionator comprising a two-pass tray configuration is shown. A feed mixture 2 is introduced to fractionator 4 at feed tray 6 via feed nozzle 8, or alternatively, feed mixture 2 is introduced to fractionator 4 at feed tray 10 via feed nozzle 12. The fractionator 4 heat energy input means (not shown), such as a feed furnace partially, or completely, vaporizes the feed mixture 2 and provides ascending vapor 14 flow up through the trays 6, 10, 16 and 18 of fractionator 4. A heat energy removal means (not shown) such as a condenser, fin-fan cooler or other cooling means, cools and liquifies at least a portion of the vapor 14 which has ascended in fractionator 4 to form liquid reflux 20. Each tray 6, 10, 16 and 18 comprises vapor 14 passage means such as perforations (not shown) and vapor-liquid contact means (not shown) such bubble caps, tray valves and the like. Each tray 16 and 18 comprises a single downcomer 24 and 26, respectively. Each tray 6 and 10 comprise two downcomers, which for tray 6 are shown as 36 and 38 and for tray 10 are shown as 40 and 42. The tray downcomers 24, 26, 36, 38, 40 and 42 direct descending reflux 20 flows from each tray to the tray below. A weir 28 on each tray causes a level of reflux liquid 22 to be formed and maintained on each tray. The reflux liquid 22 flows across each tray, and then over a weir 28 to the tray below. The weir 28 height determines the liquid 22 level on the tray (e.g., the thickness of the layer of liquid 22 through which the ascending vapor 14 must pass). The feed section of the prior art fractionator 4 feed section as shown incurs operational problems. Feed 2 can be introduced to fractionator 4 with minimal upset of fractionator 4 or with only minimal entrainment of liquid 20 and 22 into vapor 14 only if a relatively modest portion of feed 2 is vaporized on the feed tray 6 or 10 or only if the feed 2 has a relatively low concentration of vapor; otherwise, rapid gaseous expansion and a large quantity vapor release can occur in the feed tray 6 or 10 zone, resulting in operational instability.

Figure 2:
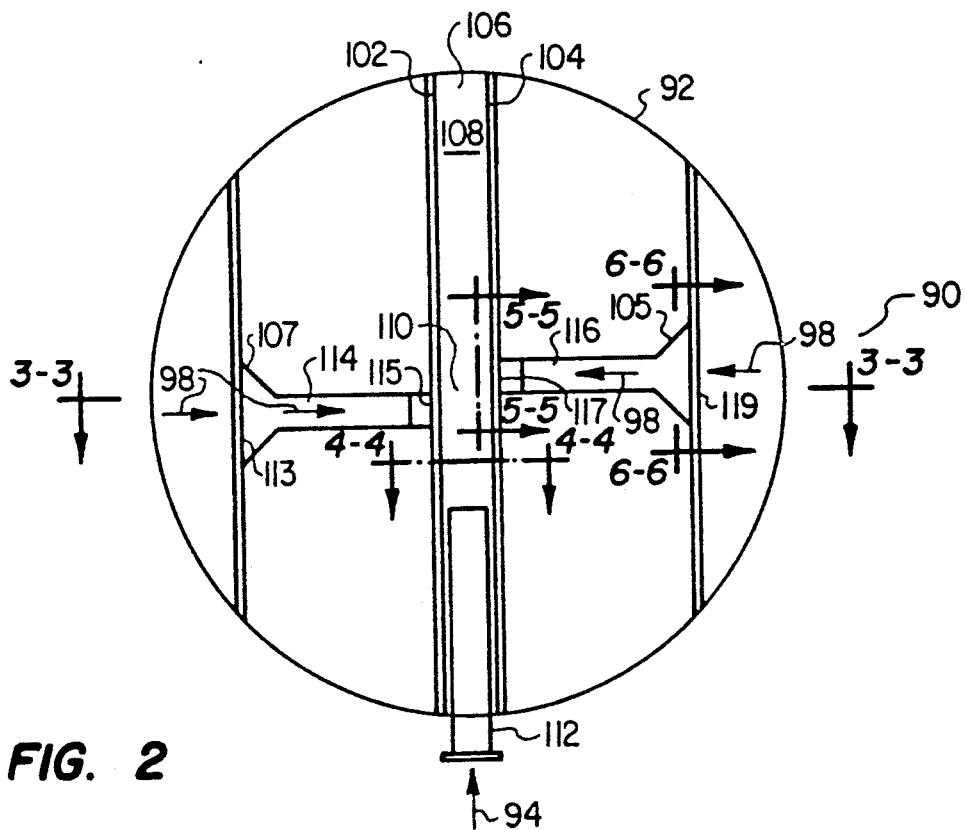
FIG. 2 is a schematic top view of one embodiment of a fractionator feed section of this invention.

FIG. 2 shows a schematic top view of one embodiment of a fractionator feed section of this invention, along a view Section 2—2. FIG. 2 indicates cross-sectional lines including Sections 3—3, 4—4, 5—5, and 6—6 which are shown in FIGS. 3, 4, 5, and 6, respectively. In FIG. 2, a fractionator feed section shown generally as 90 is provided for a fractionator 92 to which is fed a feed mixture 94 comprising a vapor component (not shown) and a liquid component (not shown). Fractionator 92 comprises a tray (96 in FIG. 3 below) above the feed section 90 which passes liquid reflux 98 to the feed section 90. In one variation of this embodiment, the feed section 90 comprises a downwardly extending, elongated first baffle 102, a downwardly extending, elongated second baffle 104, a seal pan 106 below the first baffle 102 and the second baffle 104. In this FIG. 2, only the top of the seal pan 106 can be viewed. The seal pan 106 comprises a seal pan mixture of liquids shown generally as 108 into which a portion of the first baffle 102 and a portion of the second baffle 104 extend to form a mixing zone shown generally as 110. The feed nozzle 112 introduces the feed 94 into the mixing zone 110. A trough 114 having an trough 114 entry 113 and outlet 115 introduces and passes liquid reflux 98 to the mixing zone 110, wherein the liquid component of the feed 94 and the liquid reflux 60 98 mix to form the seal pan 106 mixture of liquids 108. Preferably, the trough 114 has a taper zone 107 in which the entry 113 narrows to the dimension of the exit 115. This narrowing creates space for expansion of vapor components of the feed 98. In the variation of this embodiment of this invention shown in FIG. 2, a second trough 116 having an trough 116 entry 119 and outlet 117, and a taper zone 105 introduces and passes liquid reflux 98 to the mixing zone 110, wherein the liquid component of the feed 94 and the liquid reflux 98 mix to form the seal pan 106 mixture of liquids 108. In a preferred variation as shown in FIG. 2, trough 114 and trough 116 are offset such that reflux liquid 98 from trough 114 does not directly impact reflux liquid 98 from trough 116, and preferably splashing is avoided in mixing zone 110. Certain numbers descriptive of items found in FIG. 2 are used in FIGS. 3, 4, 5, and 6, and have the same meaning assigned to them in FIG. 2.

Figure 3:
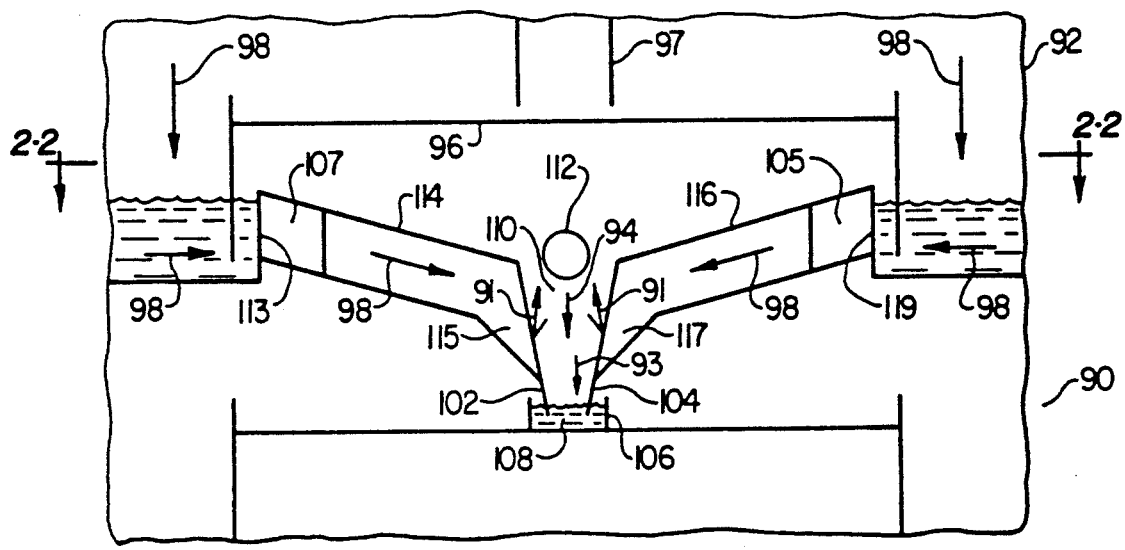
FIG. 3 is schematic side view of one embodiment of a fractionator feed section of this invention.

FIG. 3 is schematic side view of one embodiment of a fractionator feed section 90 of this invention along Section 3—3 as described in FIG. 2, above. In FIG. 3, a fractionator feed section shown generally as 90 is provided for a fractionator 92 to which is fed a feed mixture 94 comprising a vapor component 91 and a liquid component 93. Fractionator 92 comprises a tray 96 above the feed section 90 which passes liquid reflux 98 to the feed section 90. A downcomer 97 delivers reflux (not shown) to tray 96 from the tray above tray 96. The seal pan 106 comprises a seal pan mixture of liquids 108 into which a portion of the first baffle 102 and a portion of the second baffle 104 extend to form a mixing zone shown generally as 110. The feed nozzle 112 introduces the feed 94 into the mixing zone 110. A trough 114 having an trough 114 entry 113 and outlet 115, and taper zone 107, introduces and passes liquid reflux 98 to the mixing zone 110, wherein the liquid component of the feed 94 and the liquid reflux 98 mix to form the seal pan 106 mixture of liquids 108. In the variation of this embodiment of this invention shown in FIG. 3, a second trough 116 having an trough 116 entry 119 and outlet 117, and taper zone 105, introduces and passes liquid reflux 98 to the mixing zone 110, wherein the liquid component of the feed 94 and the liquid reflux 98 mix to form the seal pan 106 mixture of liquids 108.

Figure 4:
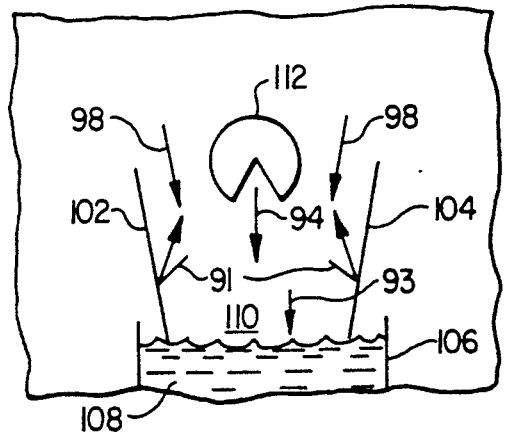
FIG. 4 is a schematic side view of a mixing zone and a feed nozzle of one embodiment of a fractionator feed section of this invention.

FIG. 4 is schematic view of a mixing zone of one embodiment of a fractionator feed section 90 of this invention along Section 4—4 as described in FIG. 2, above. The feed nozzle 112 preferably has been adapted to direct the flow of feed 94 downward to the seal pan 108. First baffle 102 and second baffle 104, in conjunction with seal liquid 108 form mixing zone 110, wherein feed 94 is mixed with reflux liquid 98. Vapor component 91 of the feed 94 preferably contacts the first 102 and second baffle 104 to change flow directions and disengage any entrained liquids 93.

Figure 5:
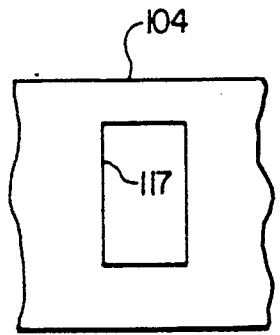
FIG. 5 is a schematic view of a portion of a baffle and reflux trough of one embodiment of a fraction feed section of this invention.

FIG. 5 is schematic view of a baffle 104 and a trough 116 entry 119 of one embodiment of a fractionator feed section 90 of this invention along Section 5—5 as described in FIG. 2, above. Trough 116 (not shown) outlet 117 is preferably adapted to intersect with the second baffle 104.

Figure 6:
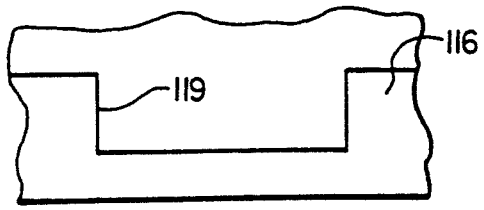
FIG. 6 is a schematic view of a portion of a reflux trough of one embodiment of a fraction feed section of this invention.

FIG. 6 is schematic view of a trough 116 outlet 117 of one embodiment of a fractionator feed section 90 of this invention along Section 6—6 as described in FIG. 2, above, and which when viewed alone or in conjunction with FIGS. 2 and 3 show a preferred variation of this embodiment of this invention.

Variations in the foregoing invention can be made without departing from the spirit and scope thereof.

What is claimed is:

1. A fractionating process for separating a feed mixture into a distillate product fraction and a residual liquid product fraction in a fractionating column comprising a feed section, wherein said feed mixture comprises a liquid and a vapor component containing entrained feed liquid, said fractioning processing comprising (i) introducing heat energy to vaporize said liquid to form ascending vapor, (ii) removing heat energy to condense vapor to form descending liquid reflux, (iii) contacting said ascending vapor with said descending liquid reflux, and further comprising:

a. forming, in said fractionating column feed section, a mixing zone between a first elongated baffle, a second elongated baffle, and a seal pan below said first elongated baffle and second elongated baffle, said seal pan comprising a seal pan mixture of liquids into which a portion of said first elongated baffle and said second elongated baffle extend;

b. feeding said feed mixture downward into said mixing zone wherein said vapor component of said feed contacts said first elongated baffle and said second elongated baffle causing said vapor component to change direction which results in disengagement of said entrained feed liquid which is permitted to fall downward into said seal pan;

c. feeding said descending liquid reflux in said fractionating column feed section to said mixing zone; and, d. mixing said feed mixture with said liquid reflux to form said seal pan mixture of liquids.

* * * * *